United States Patent
Henne

(10) Patent No.: US 8,010,234 B2
(45) Date of Patent: Aug. 30, 2011

(54) CONTROL SYSTEM AND TEACH PENDANT FOR AN INDUSTRIAL ROBOT

(75) Inventor: Tormod Henne, Sandnes (NO)

(73) Assignee: ABB AS, Billingstad (NO)

( * ) Notice: Subject to any disclaimer, the term of this patent is extended or adjusted under 35 U.S.C. 154(b) by 1286 days.

(21) Appl. No.: 11/642,789

(22) Filed: Dec. 21, 2006

(65) Prior Publication Data

US 2007/0164696 A1    Jul. 19, 2007

(30) Foreign Application Priority Data

Dec. 21, 2005   (EP) ..................................... 05027996

(51) Int. Cl.
*H01H 9/02*     (2006.01)
*H01H 15/06*    (2006.01)

(52) U.S. Cl. ........ 700/264; 700/245; 307/113; 307/139; 200/329; 200/332.2; 901/3; 901/49

(58) Field of Classification Search .................. 700/245, 700/264; 307/112, 113, 139; 200/42.01, 200/332.2, 329, 341, 345; 180/272; 361/632; 901/2, 3, 49
See application file for complete search history.

(56) References Cited

U.S. PATENT DOCUMENTS

| | | |
|---|---|---|
| 4,888,708 A | 12/1989 | Brantmark et al. |
| 5,444,203 A | 8/1995 | Gunnarsson |
| 6,134,102 A * | 10/2000 | Worn et al. ................. 361/679.3 |
| 6,160,324 A * | 12/2000 | Terada et al. .................. 307/116 |
| 2003/0018411 A1 | 1/2003 | Suita et al. |
| 2003/0027107 A1* | 2/2003 | Fukui et al. .................... 434/100 |
| 2004/0065535 A1 | 4/2004 | Fukui et al. |
| 2005/0166413 A1* | 8/2005 | Crampton ........................ 33/503 |
| 2007/0069161 A1* | 3/2007 | Camm et al. .............. 250/504 R |
| 2008/0255704 A1* | 10/2008 | Braut ............................ 700/264 |

FOREIGN PATENT DOCUMENTS

| | | |
|---|---|---|
| EP | 0 310 958 A1 | 4/1989 |
| EP | 0 927 611 A1 | 7/1999 |
| EP | 1 229 562 A1 | 8/2002 |
| WO | WO 2007/039785 | * 4/2007 |

OTHER PUBLICATIONS

European Search Report, dated Mar. 20, 2009, issued in connection with counterpart European Application No. EP 05 02 7996.

* cited by examiner

*Primary Examiner* — Khoi Tran
*Assistant Examiner* — Spencer Patton
(74) *Attorney, Agent, or Firm* — Venable LLP; Eric J. Franklin

(57) ABSTRACT

A live handle switch in the form of a hand operated safety switch for an industrial robot or a machine is described. The live handle comprises a safety certified switch for operating a robot or other machine safely while under manual control. The live handle switch may be comprised in a portable robot controller of the TPU Teach Pendant Unit type. Such a TPU may comprise control means for moving a robot in three or more degrees of freedom. In other aspects of the invention a system comprising a robot and a control unit and the live handle switch are described.

14 Claims, 3 Drawing Sheets

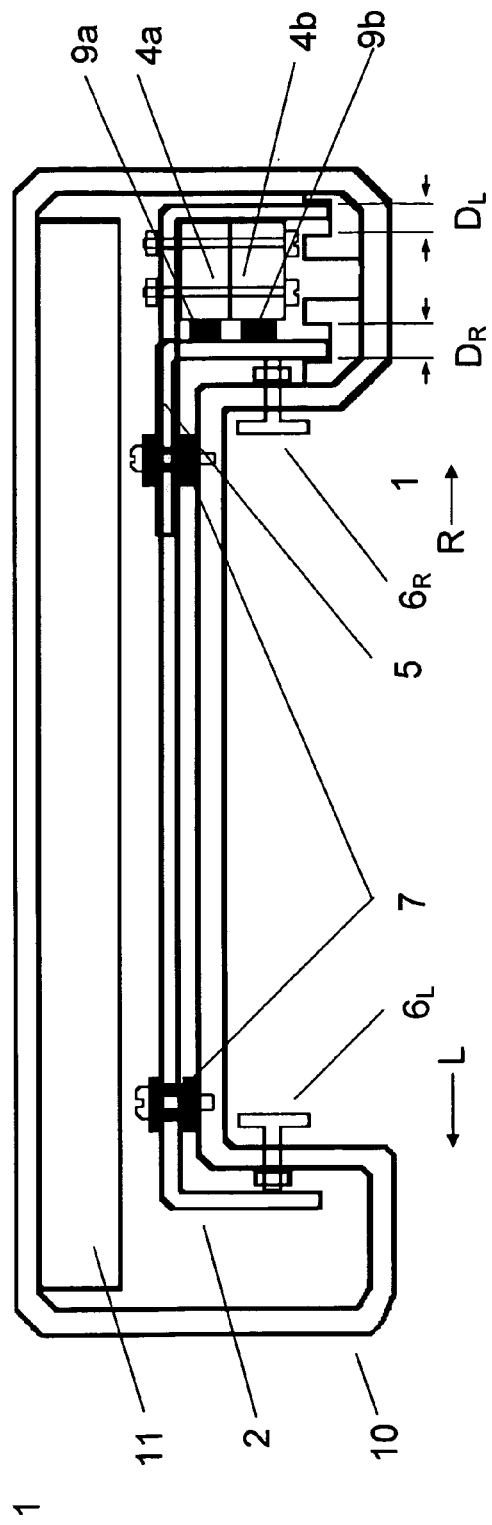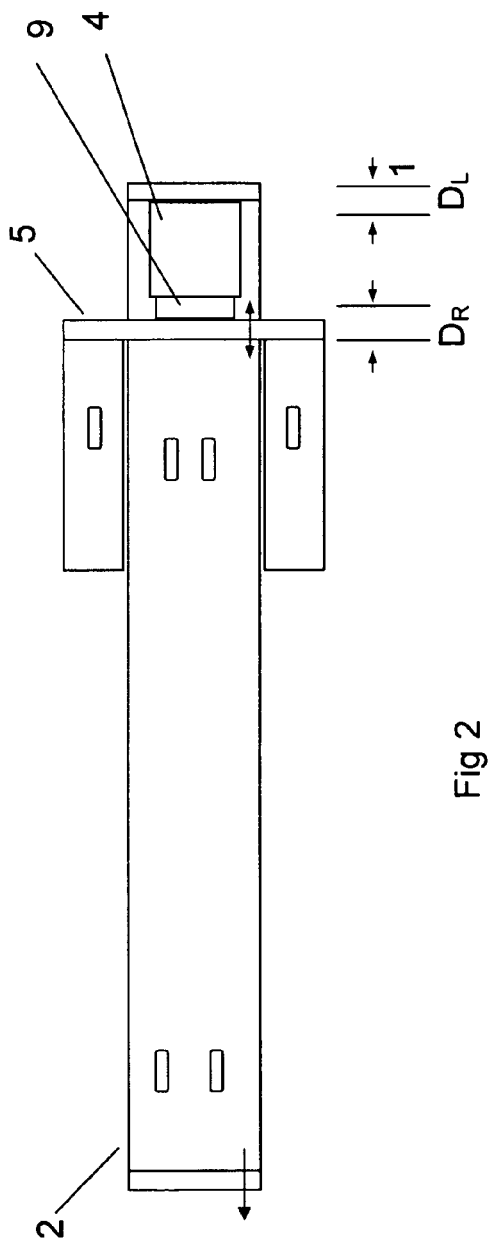
Fig 1
Fig 2

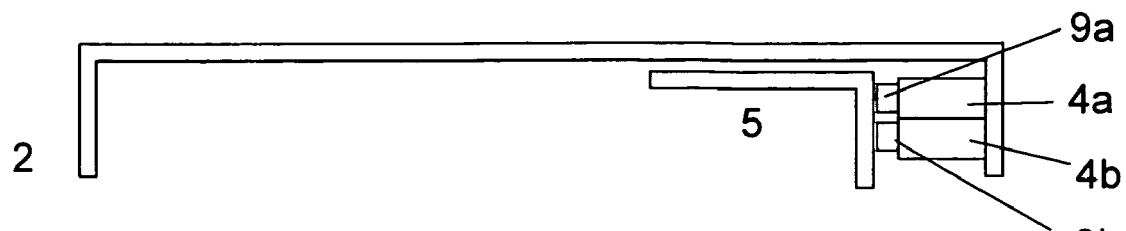
Fig 3a
← L        R → O
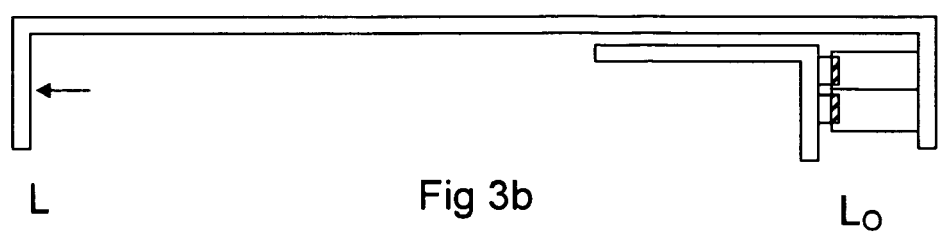
L        Fig 3b        $L_O$
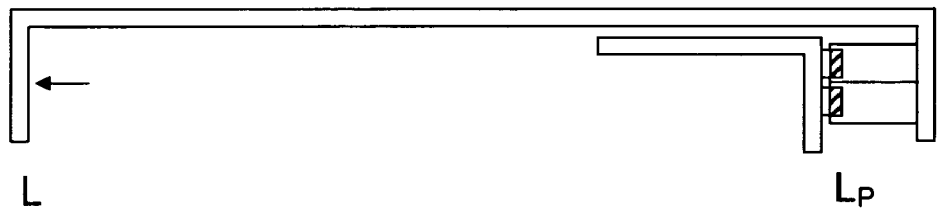
L        Fig 3c        $L_P$
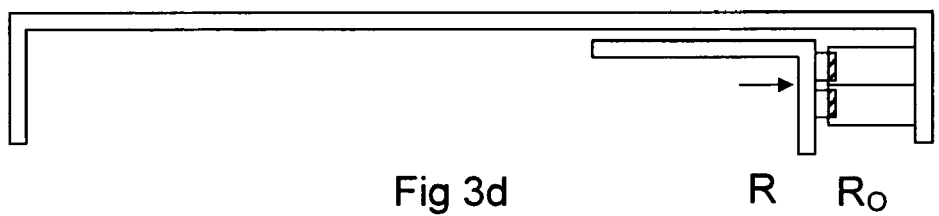
Fig 3d        R    $R_O$
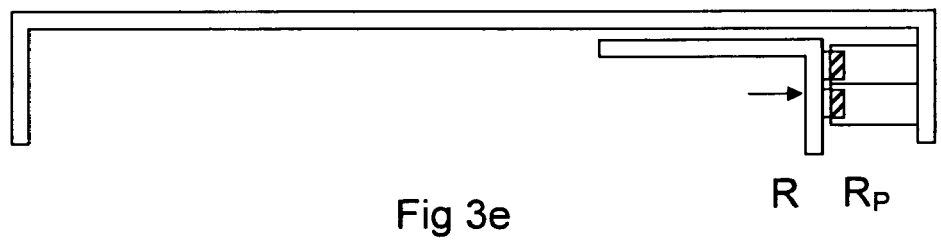
Fig 3e        R    $R_P$

CONTROL SYSTEM AND TEACH PENDANT FOR AN INDUSTRIAL ROBOT

CROSS-REFERENCE TO RELATED APPLICATIONS

This application claims priority to European patent application 05027996.7 filed 21 Dec. 2005.

TECHNICAL FIELD

The invention relates to a control system for an industrial robot of the kind comprising a portable robot controller or teach pendant for manually controlling movement of a robot or manipulator arm. In particular the invention relates to an live handle switch or enabling device for safe use of a robot or other machine under manual control.

BACKGROUND ART

Manually controlled movement of a robot arm is used especially during a programming stage in order to teach the robot to follow an operating path defined by a number of set points. A memory means in the control system may store the coordinates of said set points as position instructions and other operating instructions which, together with said set points, may define a work cycle of the robot and means arranged, during automatic running of the robot, to control the robot in accordance with information stored in the memory means during the programming stage.

In a control system for an industrial robot, the robot during programming is often run with the aid of a first control means which can be manually influenced, a means such as a joystick. The joystick is often comprised in a portable control unit also called a Teach Pendant Unit or TPU. The robot or end effector of the robot is successively moved to each of said set points or waypoints which define the movement path or the operating positions that the robot is to follow or assume during automatic operation. These positions may be stored in the form of a sequence of position instructions in a program memory, i.e. the memory means, present in the robot, or in a control unit. In addition to the pure position instructions, other operating instructions are stored in the program memory giving further information about the working cycle of the robot. For example the operating instructions may give information about the desired robot velocity in a certain section of the movement, about control of outputs from the robot to external equipment, about a desired precision of the robot movement, about conditions for the robot movement in dependence on input signals from external sensors or equipments, about events such as switch on/off paint spray, about calls for pre-programmed subroutines, and so on. During automatic operation of the robot, the program instructions are run through successively, and the robot is displaced successively between the different programmed positions in accordance with the position instructions and further carries out the measures which are programmed into the instructions.

U.S. Pat. No. 4,888,708 to Brantmark entitled Control system for an industrial robot describes a portable unit or teach pendant unit for manual control of the robot during programming for teaching the robot to follow a trajectory or working path defined by a number of set points. The TPU described comprises a joystick arranged for controlling the movement of the robot as well as other control means with a plurality of other control functions.

A control unit or TPU for use with robot must include a safety switch of the type known as a dead man's handle or also known as a live handle switch. This device requires the operator to hold a switch in a run position such that if the operator lets go of the switch, the machine stops. A live handle switch of a TPU may comprise a certified safety switch type as described in U.S. Pat. No. 5,444,203 to Gunnarsson assigned to ABB entitled Safety Switch for an Industrial Machine. The above specification describes a three position safety switch, which is operable from a first end position via an operating position to a second end position, the safety circuit being closed (made) only in the operating position.

The present invention aims to provide an improved safety switch for a control system for an industrial robot of the kind mentioned above.

SUMMARY OF THE INVENTION

According to an embodiment of the present invention an improved live handle switch is provided arranged to control robot movement so as to stop movement in the event that the operator does not hold the live handle switch in a run position. In another embodiment the live handle switch is arranged connected to a first and a second safety switch operating means arranged such that the robot may be moved if one safety switch operating means only is held in the a run position, and such that robot movement stops if neither safety switch operating means is held in the run position. In another embodiment the live handle switch is arranged connected to a first and a second safety switch operating means arranged such that the robot may not be moved if any one of two safety switch operating means urged or held in a panic stop position.

According to another aspect of an embodiment of the present invention there is provided a portable robot control wherein the controller or TPU comprises an improved live handle switch according to an embodiment of the invention and complying with an industrial safety standard arranged to control robot movement so as to stop movement in the event that the operator does not hold the live handle switch in a run position. In another embodiment the live handle switch is arranged connected to a first and a second safety switch operating means arranged such that the robot may be moved if one safety switch operating means only is held in the a run position, and such that robot movement stops if neither safety switch operating means is held in the run position.

According to another embodiment of the present invention there is provided an improved portable robot control unit wherein the controller or TPU comprises at least two areas for holding or gripping the TPU panel, at least two of which arranged on opposite sides of the TPU, such that the one first joystick is arranged within reach of a one first hand and operable using the thumb of the one first hand and the second joystick arranged within reach of the second or other hand and operable using the thumb of the second other hand whilst holding the TPU with the second hand.

In another embodiment the improved robot controller is arranged configurable or programmable wherein the switch means operable by an up or down movement of the joystick may be arranged configured to switch on or off equipment arranged around the robot including any from the list of: colour changer device, air supply, an actuator, a tool, a tool-changer, a turntable or a jig.

According to another aspect of the present invention there is provided one or more methods for moving or controlling a robot or manipulator arm using a robot controller or teach pendant comprising an improved live handle switch according to an embodiment of the present invention, a first joystick moving or controlling a movement of a robot or manipulator arm in a first (x) and/or second (y) axis, and a second joystick moving or controlling a movement of the robot or manipulator arm in a third or z direction.

According to another embodiment of the present invention there is provided one or more methods for moving or controlling a robot or manipulator arm using a robot controller or teach pendant by holding or urging an operating handle of at least one an improved live handle switch operating means so that it is held in a run position to move or control the robot by the operator.

According to another embodiment of the present invention there is provided a system for moving or controlling a robot or manipulator arm using one or more robot controllers or teach pendants further comprising a said robot controller, a robot control unit arranged for control of at least one a robot or manipulator and wherein movement of the robot arm may be controlled by a TPU comprising an improved live handle switch according to an embodiment of the invention comprising two operating handles arranged to operate a single set of safety certified switches.

A very significant advantage of the improved robot controller according to an embodiment of the invention is provided by comprising a safety means arranged to permit an operator to operate the robot controller using one hand only. This is also a feature that provides opportunities to reduce operator fatigue. The embodiment also permits a changeover of operation from one hand to the other hand such that control of the robot does not have to be interrupted. This is because the safety arrangement provides two live handle switch operating means, one being located within reach of the left hand and the other one within reach of the right hand. The operator can hold one first live handle switch operating means in one hand, grip the second live handle switch operating means with the other hand, and then let go of the first live handle switch operating means, and control the robot with the second means. By doing so the operator can change hands or take away either hand from the TPU without interrupting control. The above new features of improved TPU offer considerably improved ease-of-use for an operator and also contributes to significant reductions in operator fatigue.

A further advantage of the improved live handle switch is that it provides for two handed operation and yet still retains the robust logic of a single-handed safety switch. A more obvious two-handed solution using two sets of safety switches, one set of switches per handle, connected in series or in parallel, would require more complex circuitry or mechanisms to avoid the undesirable alternative conditions such a configuration would cause. Conditions such as with two series-connected safety switches requiring that both handles to be enabled at the same time in order to operate; or condition in the case of two parallel-connected safety switches of having to release both handles in order to stop the machine.

Another advantage of the improved live handle switch according to an embodiment of the invention is that the established logical operations of an existing double set of certified safety switches can be used as they are now. New certification is not necessary. For example there may also be a built-in feature that will disable re-connection after panic break until the switches have been fully released. Another advantage of the improved live handle switch is that it is robust and simple compared to a possible solution based on more than one set of switches arranged in parallel, which would introduce a number of new logical (connection) case combinations to be resolved.

A robot controller comprising an improved live handle switch according to an embodiment of the invention proposes a new way for safely operating a robot under manual control. The effort required to program a robot is reduced because the movement control task may be shared between two hands as required.

In addition the improved live handle switch may be incorporated in other devices for controlling machines while under manual control. Providing safety switch devices with improved ease of use means a wider range of control and programming or configuration options is available.

BRIEF DESCRIPTION OF THE DRAWINGS

A more complete understanding of the method and system of the present invention may be had by reference to the following detailed description when taken in conjunction with the accompanying drawings wherein:

FIG. 1 shows a schematic diagram in cross section of an improved live handle in an enclosure as seen from one side according to an embodiment of the invention;

FIG. 2 shows a schematic diagram of an improved live handle as seen underneath according to an embodiment of the invention;

FIG. 3 shows schematically in cross section a series of switching positions of an improved live handle from the side according to an embodiment of the invention, the positions comprising FIG. 3*a*: Relaxed state, no connection, FIG. 3*b*. Left-side operation, switches are engaged to provide connection; FIG. 3*c*: Left-side panic position, connection broken; FIG. 3*d*: Right-side operation, switches are engaged to provide connection; FIG. 3*e*: Right-side panic position, connection is broken;

DESCRIPTION OF THE PREFERRED EMBODIMENTS

Figure 4:
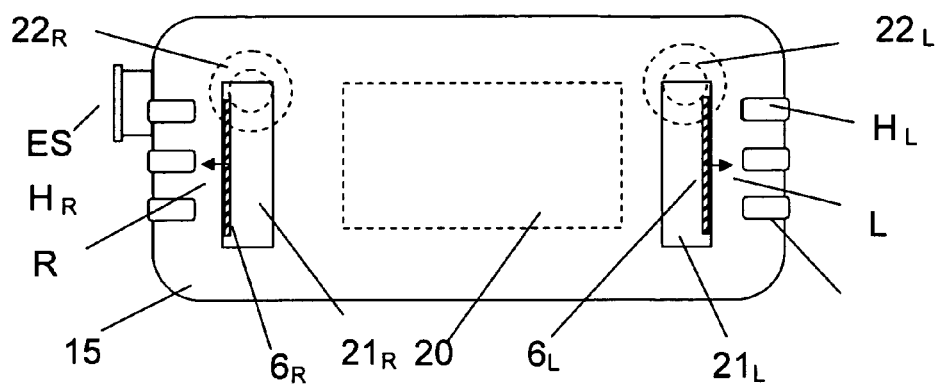
FIG. 4 shows a schematic cross section diagram from below of a portable robot controller or TPU comprising an improved live handle according to an embodiment of the invention.

FIG. 1 shows an improved live handle switch with two actuating handles according to an embodiment of the invention. It shows the live handle switch 1 and an enclosing housing. Two safe switches 4*a*, 4*b* are arranged beside each other in the switch mechanism and connected in parallel. Each switch includes a movable part 9*a*, 9*b*, which parts when urged into the switch, in the direction R from left to right in the diagram, then actuate or switch each of the two switches more or less simultaneously. Safe switches 4*a*, 4*b* are arranged mounted on a first moveable member 2. A second movable member 5 is arranged relative first member 2 so that either member may be urged and moved in the left or right direction independently of the other.

FIG. 2 is a view of the underside of the live handle switch. It shows the first member 2 with a view of the safe switches 4 arranged on it. The second member 5 is shown arranged relative to first member 2.

Referring again to FIG. 1, the first member 2 may be urged in the left direction L by an operator pressing on an actuating handle 6L. Similarly, the second movable member 5 may be urged to the right hand side direction R by an operator pressing on an actuating handle 6R in a direction to the right. When actuating handle 6R and thus second member 5 are urged to the right the actuating "button" 9*a*, 9*b* of the two safe switches 4*a*, 4*b* are urged to the right and the switch is actuated (see also additional details on typical switching sequences below).

The identical result is produced when an operator urges the left actuating handle 6L to the left. When handle 6L and first member 2 are urged to the left, the switches mounted on first member 2 are urged from right to left against second member 5, and the switches are thus actuated.

FIG. 3a-3e illustrates the operating positions that are typically available. These may be summarised as:

3a: Relaxed state O, no connection

3b: Left-side operation, $L_O$ switches are engaged to provide connection

3c: Left-side panic position $L_P$, full extent left and connection broken.

3d: Right-side operation $R_O$, switches are engaged to provide connection,

3e: Right-side panic position $R_P$, full extent right and connection is broken.

In the improved live handle one set of certified double live handle switches is operated using double mechanical live handles. The operator grip can be shifted from one hand to the other without breaking the circuit, but both sides cannot be operated simultaneously. As shown and described, this is effectively and efficiently accomplished by attaching the double set of switches to one of the actuators so they are located in between the two moveable members, one from each left and right live handle part.

In another embodiment of the improved TPU a live handle switch is comprised in a robot control unit or Teach Pendant Unit, TPU. The live handle switch may comprise a certified safety switch type as described in U.S. Pat. No. 5,444,203 to Gunnarsson assigned to ABB entitled Safety Switch for an Industrial Machine. The above specification describes a three position safety switch, which specification is hereby incorporated in this description in full by means of this reference. The safety switch is operable from a first end position via an operating position to a second end position, the safety circuit being closed (made) only in the operating position. During the return movement from second position to the first end position, the contact device is not affected, and the safety circuit thus remains open during the whole of this return movement.

Figure 5:
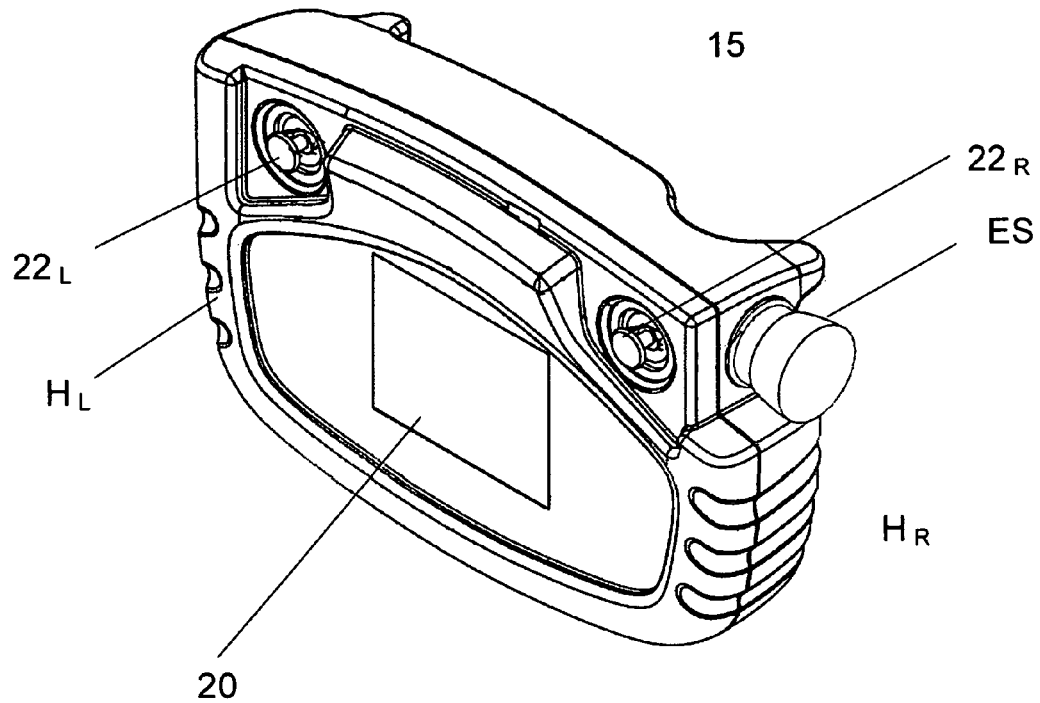
FIG. 5 shows a schematic 3-D view of a portable robot controller or TPU comprising an improved live handle according to an embodiment of the invention.

FIG. 5 shows a view in 3D of a TPU comprising an improved live handle switch according to an embodiment of the invention. This TPU also comprises two joysticks $22_L$, $22_R$.

The TPU shown has on the upper side a display screen 20 and an emergency stop button ES. It is arranged to be held using one or both handgrips, $H_R$ and/or $H_L$.

FIG. 4 shows a schematic view from below of a TPU comprising an improved live handle switch according to an embodiment of the invention. The figure shows a TPU in the form of a panel 15 or console. An emergency stop button ES is arranged as a push button on a part of the panel.

The TPU is also shown formed with a handgrip pattern on two sides. The handgrip patterns on the TPU are advantageous to make it more comfortable for the operator to grip and hold the TPU. An operator normally holds the TPU that is shown in FIG. 4 by holding the left handgrip $H_L$ in the left hand and right handgrip $H_R$ in the right hand.

The panel is preferably further arranged on the top side with a display 20 of some sort and one or more switch means (not shown). The switch means may be arranged as single pushbuttons or groups of pushbuttons. The functions of the pushbuttons are controlled by the robot control system and may be presented in plain text on the display. Generally each pushbutton when activated displays to the operator information about what measures are permitted at each moment.

One or two control means $22_L$, $22_R$, preferably a joystick, is/are mounted on the top side with its vertical axis perpendicular to the panel. It may be moved or manually influenced in a direction that may be represented as a movement with two degrees of freedom. The second control means may, if it also is a joystick, also be moved or manually influenced in a direction that may be representing a movement with up to two degrees of freedom. For example one direction may be configured to control or move the robot in a vertical or Z axis direction, even though in real time the operator also moves the second joystick generally in an x or y direction. On the underside of the panel are arranged two recesses $21_L$ and $21_R$. Two handles, $6_L$, $6_R$ which actuate the live handle switch inside the enclosing panel or console are arranged in the recesses. At least one of the live handle switch operating means handles $6_L$, $6_R$ arranged to operate the safety switch may be regarded as a form of enabling device within the context of robot control, and portable robot control units in particular.

The operator may hold the TPU in, say, the left hand about handgrip $H_L$ and at the same time press the safety switch operating handle $6_L$ substantially in the direction indicated L with fingers of the same hand, so holding the live handle in the run position, and capable of moving further left to the panic position. At the same time, the operator may also operate a joystick $22_L$ on the top of the panel by using the left thumb. At the same time with the TPU held and operated in the left hand, the right hand may be free, the right hand may hold the TPU, or the right hand may hold the TPU and operate one or more buttons or controls such as a right joystick $22_R$. The operator can also hold the TPU in the right hand and then remove the left hand as soon as the fingers of the right hand have pressed the safety switch operating means $6_R$, for example in the right direction R. That is to say that so long as one of the safety switch operating means $6_L$ or $6_R$ is held in a connection position $L_O$ or $R_O$ by the operator the robot can be moved. The great advantage of the improved TPU is that the operator can operate the TPU with one hand, hold the TPU in one hand and then change it to the other hand without stopping movement control of the robot.

The TPU comprising an improved live handle switch may be used to program and control an industrial robot or manipulator arm to carry out one or more of many tasks, including any task from the list of: gripping an object, manipulating an object, stacking, pick and place objects, controlling and operating an amusement ride or an installation comprising a human passenger, welding, framing a vehicle body, riveting, de-burring, fettling, grinding, coating, painting, applying sealant, applying glue, dry spraying, gluing, folding plate, bending plate, hemming plate.

In this description two opposing movements, urging to the left and/or urging to the right have been described. Plainly mechanical handles may be arranged to be urged in opposite directions to one another along another axis, one up and one down for example. In another embodiment of the invention the safety switch operating means $6_L$ or $6_R$ may be urged in another direction than L or R in order to enable use of the TPU.

In another embodiment an improved live handle switch may be arranged to operate a safety device used for operations with machines and especially robots. Robots and other machinery in an enclosed working area or cell may be arranged with safety switches to prevent machinery from operating if, for example, a gate of the cell is open. For an operator or technician to inspect equipment in a working area while machinery is under manual control the person may carry a personal safety switch comprising an improved live handle according to any embodiment. The operator can thus hold a switch by one of two mechanical actuating handles and subsequently change control over and use the other hand as required, thus reducing fatigue and improving flexibility.

It should be noted that while the above describes exemplifying embodiments of the invention, there are several variations and modifications which may be made to the disclosed solution without departing from the scope of the present invention as defined in the appended claims.

I claim:

1. A hand operated live handle switch for an industrial robot or machine, said live handle switch comprising:
   two safe switches connected in parallel;
   a first moveable member and a second movable member configured to actuate the two safe switches by urging either of the first moveable member or the second moveable member against said safe switches, wherein the safe switches are attached to the first moveable member and are positioned between the first moveable member and the second moveable member;
   wherein said first movable member and said second movable member are movable with respect to a housing of the hand operated live handle switch; and
   wherein the hand operated live handle switch is operable to enable or disable operation of the industrial robot or machine.

2. The hand operated live handle switch according to claim 1, further comprising:
   a first handle and a second handle operatively connected to the first moveable member and the second movable member and configured to actuate the safe switches.

3. The hand operated live handle switch according to claim 2, wherein said safe switches are arranged such that one of the first moveable member and the second moveable member may be moved from a run position to a neutral no-connection position without opening a circuit.

4. The hand operated live handle switch according to claim 3, wherein said safe switches are attached to one of the first moveable member and the second moveable member such that the safe switches may alternatively be actuated by another of the first moveable member and the second moveable member without opening the circuit.

5. A teach pendant unit, comprising:
   a housing; and
   a hand operated live handle switch comprising:
      two safe switches connected in parallel, and
      a first moveable member and a second movable member configured to actuate the two safe switches by urging either of the first moveable member or the second moveable member against said safe switches, wherein the safe switches are attached to the first moveable member and are positioned between the first moveable member and the second moveable member;
   wherein the first movable member and the second movable member are movable with respect to the housing.

6. The teach pendant unit according to claim 5, wherein said hand operated live handle switch further comprises a first operating handle operatively connected to the first moveable member.

7. The teach pendant unit according to claim 6, wherein said hand operated live handle switch further comprises a second operating handle.

8. A system, comprising:
   a robot;
   a robot controller; and
   a teach pendant unit comprising:
      a housing, and
      a hand operated live handle switch comprising:
         two safe switches connected in parallel, and
         a first moveable member and a second movable member configured to actuate the two safe switches by urging either of the first moveable member or the second moveable member against said safe switches, wherein the safe switches are attached to the first moveable member and are positioned between the first moveable member and the second moveable member;
      wherein the first movable member and the second movable member are movable with respect to the housing.

9. The system according to claim 8, wherein said teach pendant unit further comprises at least one control member.

10. The system according to claim 9, wherein said at least one control member comprises a joystick.

11. The system according to claim 9, wherein said teach pendant unit further comprises at least one operating handle, wherein said at least one control member and the at least one operating handle are positioned relative to each other for operation using one hand.

12. The system according to claim 9, wherein the teach pendant unit further comprises at least two handgrips or handholds for holding the teach pendant unit arranged on opposite sides of the teach pendant unit, such that the at least one control member is arranged on the teach pendant unit within reach of a first hand and to be operable using a thumb of the first hand while holding the teach pendant unit with the first hand, and at least one control member is arranged within reach of a second hand and to be operable using a thumb of the second hand while holding the teach pendant unit with the second hand.

13. The system according to claim 8, wherein said hand operated live handle switch is arranged as a personal safety switch or enabling device.

14. The system according to claim 8, wherein the teach pendant unit further comprises at least one operating member configured to operate the live handle switch, such that an operator holding or urging the at least one operating member may hold the hand operated live handle in a run position to enable the robot to be moved or controlled.

* * * * *